United States Patent [19]
Hallenbeck

[11] 3,895,924
[45] July 22, 1975

[54] CONSUMABLE WELD INSERT

[76] Inventor: Emerson J. Hallenbeck, 2934 Shoreland Ave., Toledo, Ohio 43611

[22] Filed: Feb. 7, 1973

[21] Appl. No.: 330,203

Related U.S. Application Data

[62] Division of Ser. No. 171,546, Aug. 13, 1971, Pat. No. 3,770,302.

[52] U.S. Cl. .................. 29/183; 29/501; 228/56
[51] Int. Cl. .................................................. B22f 5/00
[58] Field of Search .......... 29/156.6, 183, 500, 501, 29/502; 228/50, 56

[56] References Cited
UNITED STATES PATENTS

| | | | |
|---|---|---|---|
| 1,444,473 | 2/1923 | Light et al. | 29/156.6 |
| 1,783,047 | 11/1930 | Marshall | 29/156.6 X |
| 2,635,932 | 4/1953 | Heusser | 29/156.6 UX |
| 2,731,933 | 1/1956 | Phillips | 228/50 |
| 2,792,490 | 5/1957 | Risch et al. | 219/137 |
| 3,033,145 | 5/1962 | Thielsch | 285/22 X |
| 3,101,532 | 8/1963 | Christensen | 285/286 X |

*Primary Examiner*—L. Dewayne Rutledge
*Assistant Examiner*—O. F. Crutchfield
*Attorney, Agent, or Firm*—Allen D. Gutchess, Jr.

[57] ABSTRACT

This invention relates to a consumable weld insert used in welding adjacent ends of pipe or tubing. The insert is of a unique wedge-shaped configuration, as viewed in transverse cross section, with the thickest portion being near the inner edge of the insert and the thinnest portion being at the outer edge. The inner edge of the insert is also rounded. The shape of the consumable weld insert helps maintain uniform heat distribution therein during welding and produces more uniform melting thereof. The shape also minimizes heat dissipation from the insert to the adjacent pipe ends so that the heat is concentrated in the insert. Additionally, the shape enables the welded, joined pipe to be straighter when the weld is completed.

6 Claims, 5 Drawing Figures

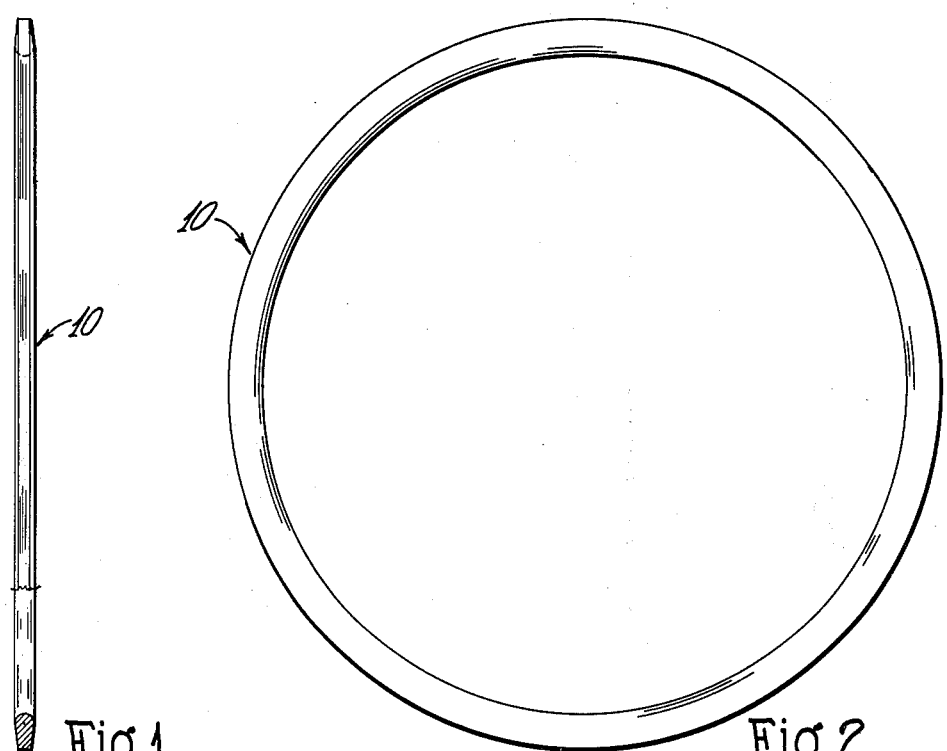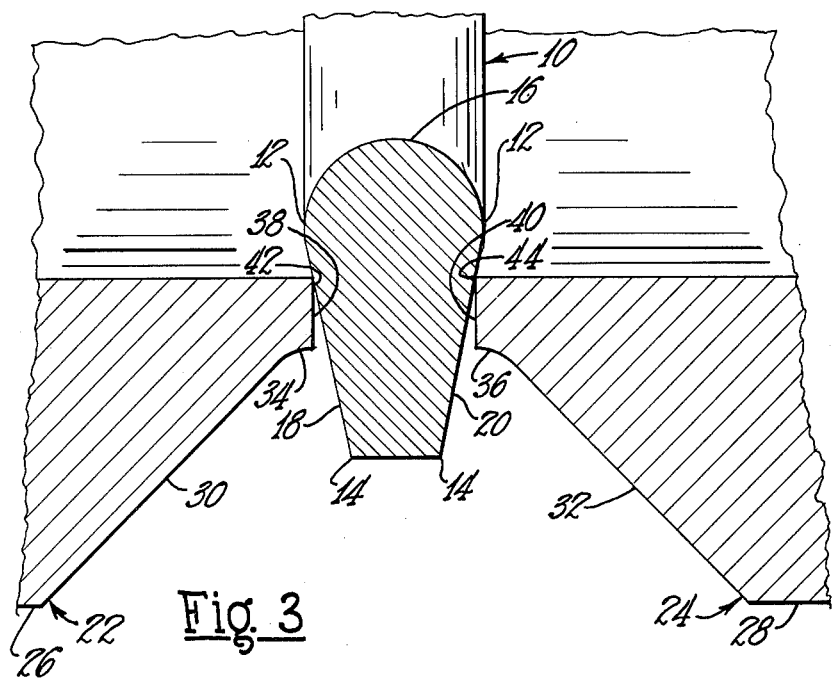

CONSUMABLE WELD INSERT

This is a division of application Ser. No. 171,546, filed Aug. 13, 1971 now U.S. Pat. No. 3770,302.

This invention relates to welding of adjacent ends of cylindrical bodies and specifically to a consumable weld insert for same.

High quality pipe and tubing of stainless steel and other special metal alloys are being more and more commonly used. A particular application for such pipe is in nuclear power plants or the like where sodium or other heat transfer fluids are used to transfer heat from a nuclear source to another medium, such as water, to produce super-heated steam for turbines. Such pipe must withstand extremely demanding service conditions, including severe corrosion, high rates of fluid flow, contact with radioactive materials, sudden changes in temperature due to the high rates of heat transfer involved, and high pressures. Of necessity, the welds used to connect ends of the pipe sections must be of optimum quality and meet exacting requirements.

In welding the ends of the pipe sections, the ends are usually cut back, particularly those with thicker walls, to form a V-shaped, outwardly-facing channel between the pipe sections. A consumable pre-formed weld ring is then placed between the otherwise abutting end wall portions and is tack welded in place. A tungsten electrode, commonly used with an inert gas, is employed to melt the weld ring and fuse the abutting ends in a root welding pass. Subsequently, filler metal can be used to fill the channel, if required, through one or more cover passes. This welding technique is discussed in more detail in U.S. Pat. No. 2,792,490.

Considerable skill is required to weld the consumable insert or ring effectively. One common defect is that a portion of the weld metal tends to be sucked outwardly from the space between the pipe ends. Also, in some instances, the inner annular edge of the welding insert will not be properly heated, thereby forming an apparent oxide film and an improper weld. The film forms even though a purge gas is used inside the pipes.

Various shapes of welding rings have been proposed in an effort to produce better welds with a root pass, and with less skill being necessitated. For example, the aforementioned patent discloses a welding ring having a T-shaped transverse cross section, with the horizontal bar of the T-shape being within the pipe sections and immediately adjacent the inner surfaces thereof. This type of welding ring is generally satisfactory when the inner diameters of the adjacent pipe sections are identical. Unfortunately, this condition does not always exist. Consequently, one portion of the cross bar of the T-shape is spaced from the inner surface of the wall section with the result that an oxide appears to form and a sound weld is prevented. With this condition, if extreme, substantially no heat will be conducted through the ring to the pipe section and the ring may melt without effectively fusing the adjacent ends of the pipe sections.

Other rings, such as those shown in U.S. Pat. No. 3,033,145 have inner diameters with sharp corners. These cause improper heating of the inner edge and appear to leave oxides at those portions. The films thereby require additional heating, which causes the inner portion of the ring to be excessively hot so that the metal spreads out too much and a concave weld results.

The new weld insert or ring according to the invention overcomes the above-mentioned disadvantages and also has a number of important advantages. The insert is of wedge-shaped configuration in transverse cross section with the thicker portion being toward the inner diameter of the insert and the thinner portion being at the outer diameter. The inner edge is also rounded. The thicker inner portion of the ring helps to eliminate the problem of the weld metal being sucked outwardly. With this shape, the ring is only in line contact with the adjacent edges of the pipe section ends. Consequently, less heat is dissipated from the ring to the pipe sections. The concentration of heat in the ring enables the heat to be used more effectively and, with less heat spread to the pipe sections, there is even less chance that the molten metal of the weld insert will be sucked out. The rounded inner edge of the insert reduces heat dissipation and prevents oxidation therefrom as contrasted to those inserts heretofore known having sharp corners. The heat throughout the ring thereby is maintained more uniformly. This design also enables the inner edge of the weld of the root pass to project slightly into the interior of the pipe sections, which is more desirable than a flush or concave weld at the interior.

The wedge-shape configuration of the insert further enables the pipe sections to be positioned when the welding insert is positioned eccentrically, in a manner such that the tendency for the sections to sag at a vertical joint when the weld is completed is offset, as will be discussed more fully subsequently.

It is, therefore, a principal object of the invention to provide an improved consumable weld insert for welding together ends of cylindrical bodies.

Another object of the invention is to provide a consumable weld insert for pipe sections of a shape such that less heat is transferred to the pipe sections.

A further object of the invention is to provide a weld insert which is heated more uniformly.

Still another object of the invention is to provide a weld insert for welding ends of adjacent pipe sections, which insert enables the pipe sections to be initially positioned in a manner to offset the tendency of the cylindrical sections to sag at a vertical joint during welding.

Many other objects and advantages of the invention will be apparent from the following detailed description of a preferred embodiment thereof, reference being made to the accompanying drawings, in which:

FIG. 1 is an edge view in elevation, with parts broken away and with parts in section, of a consumable weld insert embodying the invention;

FIG. 2 is a side view in elevation of the insert of FIG. 1;

FIG. 3 is a greatly enlarged view in longitudinal cross section, taken through ends of two adjacent pipe sections and with a consumable weld insert embodying the invention located therebetween;

Referring particularly to FIGS. 1 and 2, a consumable weld insert 10 is shown according to the invention. While the insert 10 is shown in the form of a continuous ring, it can also be formed of much greater length and in the form of a spiral so that it can be cut to a predetermined length and fitted between ends of pipes or other abutting bodies to be welded. In either case, the insert is of a ring-like configuration, whether continuous or discontinuous, when in welding position.

Figure 4:
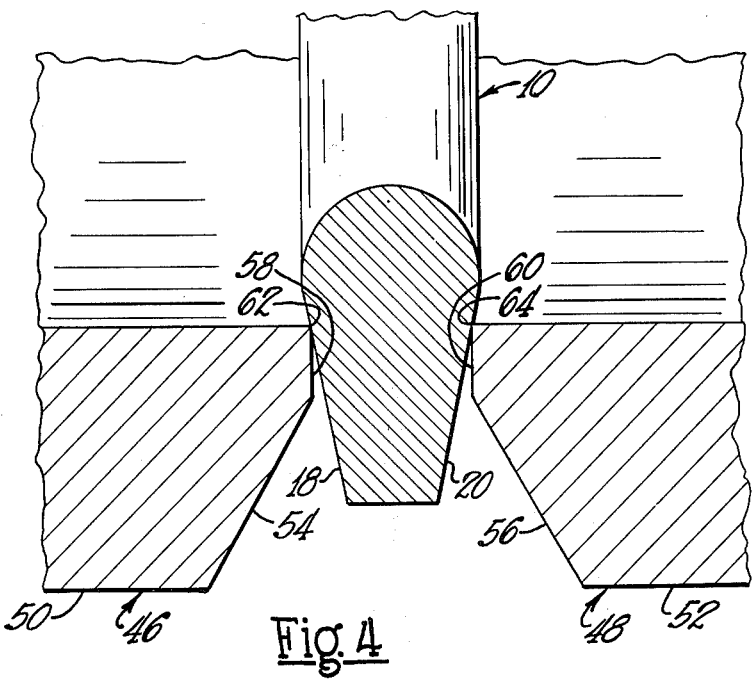
FIG. 4 is a view similar to FIG. 3 but with the adjacent ends of the pipe sections shaped differently.

As shown more particularly in FIGS. 3 and 4, the insert 10 is of a generally wedge-shaped configuration, having a thicker portion 12 toward the inner edge of the insert and a thinner portion 14 at the outer edge. The thicker portion is preferably at least fifty percent thicker than the thinner portion 14 and, as shown, is approximately twice as thick. Beyond the thicker portion 12, the inner edge is rounded at 16 and is substantially of semi-circular configuration. Between the thick portion 12 and the thin portion 14, the insert has two planar, tapered side walls 18 and 20. These form a continuous, smooth, substantially tangential surface with the rounded inner surface 16.

Referring to FIG. 3, the insert 10 is shown between ends of two pipe sections or other cylindrical bodies 22 and 24. Walls 26 and 28 of the pipe sections are usually sufficiently thick that they are beveled at 30 and 32 for the weld joint therebetween. The bevels, as shown in FIG. 3, have rounded inner edge portions 34 and 36 to provide what is known in the art as a "J" bevel. Annular squared ends 38 and 40 remain on the pipe sections 22 and 24. These portions are in parallel planes and meet the tapered planar side walls 18 and 20 of the insert 10 only in generally circular line contact at 42 and 44. The spaces between the insert and the pipe ends face outwardly and readily fill with weld metal.

The minimal contact between the insert 10 and the sections 22 and 24 reduces heat dissipation from the insert to the walls 26 and 28 so that more heat is concentrated in the insert. This also prevents the weld insert material from being sucked out of the joint during welding, which otherwise more readily tends to occur when too much heat is dissipated from the insert to the adjacent pipe section walls. The thick inner portion 12 also offsets this tendency. Further, the rounded inner edge 16 minimizes dissipation of heat from that portion of the insert so that the overall insert is maintained at a more uniform temperature. Neither will oxides tend to form at the inner portions of the insert.

In a specific example, the weld insert 10 has a thickness of one-eighth inch at the thick portion 12 and a thickness of one-sixteenth inch at the thin portion 14. The rounded portion 16 has a radius of one-sixteenth inch. The inner edge of the insert projects into the pipe sections at least one-sixteenth inch and projects outwardly beyond the ends 38 and 40 at least one-sixteenth inch. The annular ends 38 and 40, as shown for illustration, also have a width of one-sixteenth inch.

The insert 10 is shown with a standard bevel joint in FIG. 4. Here the insert 10 is located between two pipe or cylindrical sections 46 and 48 having walls 50 and 52. Straight bevels 54 and 56 are formed on the walls 50 and 52 leaving annular square end surfaces 58 and 60. The straight bevel joints are generally used with thinner walls and the J-bevel joints are used with pipe sections having thicker walls. The side walls 18 and 20 of the insert again contact the annular end surfaces 58 and 60 only in generally circular lines 62 and 64 to reduce unwanted heat dissipation from the insert to the pipe sections.

Figure 5:
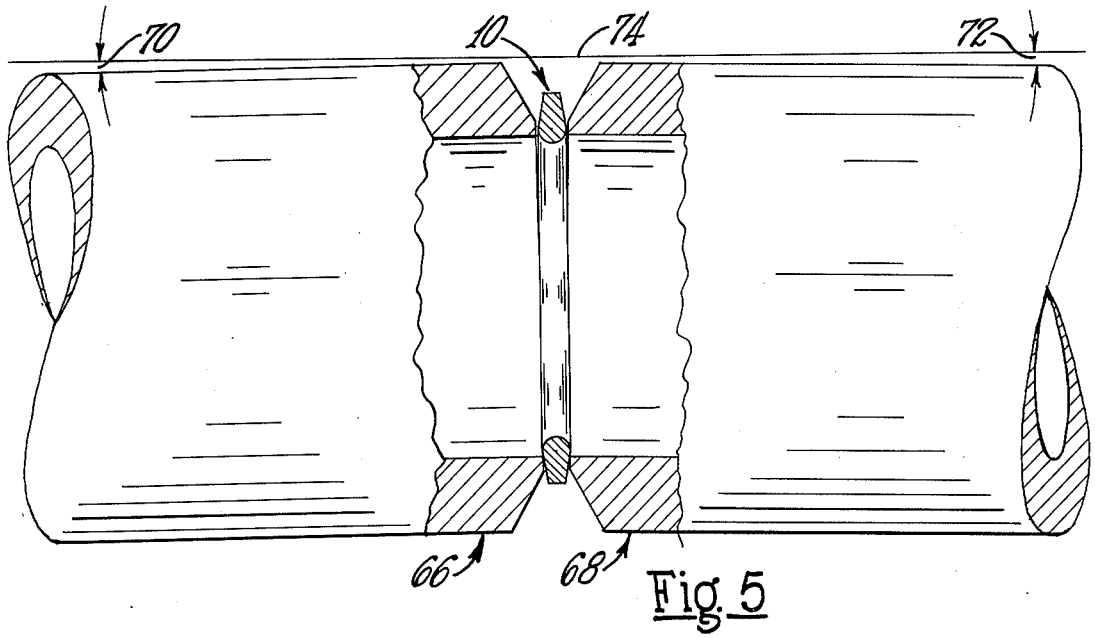
FIG. 5 is a view on a smaller scale of two pipe sections with adjacent end portions broken away and in section, and with a welding ring embodying the invention therebetween in an eccentric position, ready for welding.

With pipe section joints located in vertical planes, it is preferable to position the insert 10 eccentrically between the pipe sections so that the center of the insert is directly above and spaced from the longitudinal axes of the pipe sections. The insert 10 is so disposed in FIG. 5. The eccentric position offsets the gravitational downward flow of weld metal which occurs as the insert is melted during the welding operation. FIG. 5 also illustrates another important advantage of the invention. With the wedge-shaped insert 10 positioned eccentrically, as shown, the thicker portion of the insert 10 is positioned between the upper end portions of pipe sections 66 and 68 and the thinner portion of the insert is between the lower end portions of the pipe sections. This places the pipe sections 66 at a slight inverted shallow V-shape configuration so that both pipe sections form narrow, acute angles 70 and 72 with a horizontal line 74, as indicated. When the weld is completed, the adjacent pipe sections will then be in substantially true horizontal, axial alignment because there is a tendency for the pipe sections to sag while being welded. Hence, the slight initial angle of the pipe sections is offset by the sagging effect during welding.

In the use of the welding insert, it is placed eccentrically between the pipe sections, as shown in FIG. 5, and an inert purge gas is supplied to the interior of the pipe sections. The insert is then tack welded in place, preferably in four locations. The welder then begins welding at the bottom of the insert and progresses first 180° in one direction and then 180° in the opposite direction to complete the root pass and the weld. Several filler passes can then be used to fill the channel formed by the bevels and the weld insert, and then a cap or cover pass completes the joint. Tungsten electrodes with inert gas are used for the welding, particularly with stainless steel pipe. With some thin-wall tubing, a root and cover weld can be performed in one pass.

Various modifications of the above described embodiment of the invention will be apparent to those skilled in the art and it is to be understood that such modifications can be made without departing from the scope of the invention, if they are within the spirit and the tenor of the accompanying claims.

I claim:

1. A consumable weld insert made of weld metal for connecting adjacent ends of two sections of pipe or the like, said insert comprising a ring-like body of weld metal, said ring having an internal diameter and an external diameter, with an inner edge portion adjacent the inner diameter and an outer edge portion adjacent the outer diameter, said body having a wedge-shaped, transverse cross section with the inner edge portion being thicker than the outer edge portion.

2. A consumable weld insert according to claim 1 characterized by the inner edge portion of said body being rounded as viewed in transverse cross section.

3. A consumable weld insert according to claim 1 characterized by the outer edge portion of said body having a cylindrical surface.

4. A consumable weld insert according to claim 2 characterized by said body having straight side walls extending between the inner and outer edge portions, as viewed in transverse cross section.

5. A consumable weld insert according to claim 4 characterized by said straight side walls forming continuous, smooth, substantially tangential surfaces with the rounded inner edge portion of said body, as viewed in transverse cross section.

6. A consumable weld insert according to claim 1 characterized by the thickest part of the body exceeds the thinnest part by at least 50 percent, as viewed in transverse cross section.

* * * * *